United States Patent [19]

Nakayama et al.

[11] Patent Number: 5,036,717
[45] Date of Patent: Aug. 6, 1991

[54] AUTOMOTIVE TRANSMISSION

[75] Inventors: Hiroshi Nakayama; Yoji Yamada; Toshiyuki Yumoto, all of Saitama, Japan

[73] Assignee: Honda Giken Kogyo Kabushiki Kaisha, Tokyo, Japan

[21] Appl. No.: 309,607

[22] Filed: Feb. 10, 1989

[30] Foreign Application Priority Data

Feb. 10, 1988 [JP] Japan .................................. 63-29607

[51] Int. Cl.[5] .......................... F16H 3/08; F16H 59/00
[52] U.S. Cl. ......................................... 74/333; 74/335
[58] Field of Search ................. 74/330, 331, 329, 335, 74/333; 192/108, 67 R; 180/248, 292, 233

[56] References Cited

U.S. PATENT DOCUMENTS

| | | | |
|---|---|---|---|
| 4,159,654 | 7/1979 | Hattori | 74/331 |
| 4,570,503 | 2/1986 | Theobald | 74/331 X |
| 4,594,908 | 6/1986 | Akashi et al. | 74/331 X |
| 4,805,720 | 2/1989 | Clenet | 180/248 |
| 4,864,881 | 12/1989 | Beeson et al. | 74/331 X |

FOREIGN PATENT DOCUMENTS

| | | |
|---|---|---|
| 57-9136 | 10/1982 | Japan . |
| 62-34979 | 10/1987 | Japan . |
| 2081822 | 2/1982 | United Kingdom ................ 192/108 |

Primary Examiner—Allan D. Herrmann
Assistant Examiner—Khoi Q. Ta
Attorney, Agent, or Firm—Lyon & Lyon

[57] ABSTRACT

A transmission of two parallel shaft type has a plurality of transmission gear trains and clutching means disposed between input and output shafts parallel to each other, a countershaft disposed parallel to the input and output shafts, a first gear rotatably mounted on the output shaft and rotatable in interlinked relation to the input shaft, second and third gears mounted on the counter shaft, clutching means mounted on the counter shaft for connecting the second gear with the third gear, the second gear being held in mesh with the first gear, and a fourth gear meshing with the third gear and fixed to the output shaft.

5 Claims, 6 Drawing Sheets

PRIOR ART

Fig. 7

AUTOMOTIVE TRANSMISSION

BACKGROUND OF THE INVENTION

The present invention relates to an automotive transmission, and more particularly to a transmission of the countershaft type.

Many automatic transmissions of the countershaft type have two parallel shafts, i.e., input and output shafts parallel to each other, a plurality of trains of intermeshing transmission gears disposed between the input and output shafts, and clutching means (such as hydraulic clutches, dog clutches, or the like) disposed parallel to each other in the axial direction for selecting power transmission via any one of the transmission gear trains. Engine output power which has been changed in speed by the transmission gear train selected by the clutching means is transmitted to the output shaft (see Japanese Patent Publication No. 62-34979, for example).

Figures 6, 7:
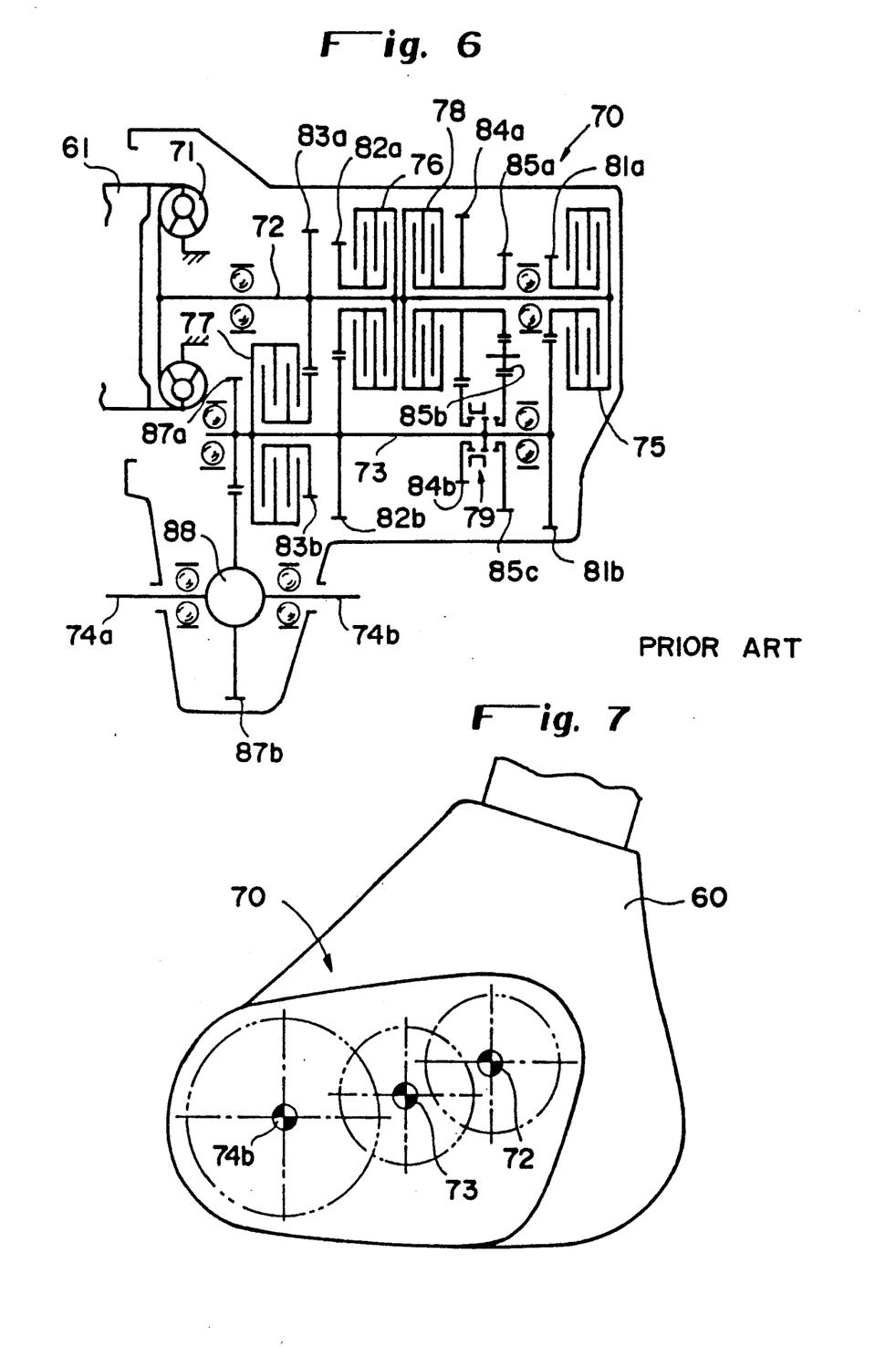
FIG. 6 is a schematic cross-sectional view of a conventional transmission.
FIG. 7 is a side elevational view of the conventional transmission.

More specifically, an automatic transmission of the countershaft type for use with an engine directed transversely in an engine compartment is shown in FIGS. 6 and 7 of the accompanying drawings. The transmission, generally designated by the reference numeral 70, has a input shaft 72 disposed coaxially with and coupled to an output shaft (flywheel) 61 of an engine 60, and an output shaft 73 and axle shafts 74a, 74b which are disposed parallel to the input shaft 72. The transmission 70 also includes four trains of intermeshing transmission gears 81a, 81b; 82a, 82b; 83a, 83b; 84a, 84b for first through fourth gear positions, one train of transmission gears 85a, 85b, 85c for a reverse gear position, four hydraulic clutches 75, 76, 77, 78, and a single dog clutch 79, all disposed between the input and output shafts 72, 73 and parallel to each other in the axial direction. Any one of the hydraulic clutches 75, 76, 77, 78 and the dog clutch 79 is operated to select one of the transmission gear trains for power transmission and speed changing. The engine output power thus changed in speed is transmitted through output gears 87a, 87b and a differential mechanism 88 to the axle shafts 74a, 74b, from which drive power is transmitted to lefthand and righthand road wheels.

FIG. 7 shows the arrangement of the shaft of the transmission. With the transmission 70 coupled to an output end of the engine 60, the input shaft 72 is disposed coaxially with the crankshaft 61 of the engine 60, and the output shaft 73 and the axle shafts 74a, 74b are positioned substantially laterally of the input shaft 72.

The transmission gear trains and the hydraulic clutches (dog clutches or the like may be employed in place of the hydraulic clutches for mechanically enabling and disabling power transmission) are disposed between the input and output shafts and parallel to each other in the axial direction. Therefore, it is difficult to reduce the axial dimension of the transmission. The axial dimension of the transmission becomes larger as the number of gear positions is increased.

With the transmission being directed transversely in the engine compartment, the engine and the transmission coupled to the rear end thereof are required to be placed in the engine compartment so as to extend in the transverse direction of the automobile. If the axial dimension of the transmission is large, any margin of the installation space available in the engine compartment for the engine and the transmission is small. Where the transmission is directed longitudinally in the engine compartment with the engine and the transmission coupled to the rear end of the engine extending longitudinally in the automobile, the rear end of the transmission projects into the passenger compartment of the automobile to a large degree, resulting in the problem of a reduce passenger compartment space in addition to the above problem of the reduced margin of the installation space in the engine compartment. Moreover, the transmission itself suffers a drawback in that the shafts thereof are longer and have reduced rigidity, increasing noise from the gears on the shafts and reducing gear durability. Furthermore, the rigidity of the transmission case is lowered and hence vibration and noise of the power line are increased.

To avoid the aforesaid shortcomings, there has heretofore been proposed, as disclosed in Japanese Utility Model Publication No. 57-9136, a transmission having one more shaft in addition to the two conventional shafts supporting the transmission gears, and a gear train disposed between the additional shaft and one of the two existing shafts and having a clutch means for selecting an auxiliary gear position. The proposed transmission can have an increased number of gear positions without increasing the axial dimension. This transmission will be referred to as a transmission of the three parallel shaft type.

With the transmission of the three parallel shaft type, when changing gear positions, an auxiliary transmission mechanism has to be shifted as well as a main transmission mechanism, resulting in complex transmission control especially for an automatic transmission. Since one more shaft is added, the direction of rotation of the output shaft is opposite to the direction of rotation of the output shaft in the transmission of the two parallel shaft type. Therefore, if the transmission of the three parallel shaft type is employed in place of the transmission of the two parallel shaft type, it is necessary to modify the overall power line of the automobile.

SUMMARY OF THE INVENTION

In view of the foregoing problems, it is an object of the present invention to provide a transmission which can solve the above problems without increasing the axial dimension thereof.

To achieve the above object, a transmission according to the present invention additionally includes, in a transmission of the two parallel shaft type having a plurality of transmission gear trains and clutching means disposed between input and output shafts parallel to each other, a countershaft disposed parallel to the input and output shafts, a first gear rotatably mounted on the output shaft and rotatable in interlinked relation to the input shaft, second and third gears mounted on the countershaft, clutching means mounted on the countershaft for connecting or disconnecting the second gear with the third gear, the second gear being held in mesh with the first gear, and a fourth gear meshing with the third gear and fixed to the output shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein.

DESCRIPTION OF THE PREFERRED EMBODIMENTS

A preferred embodiment of the present invention will hereinafter be described with reference to the drawings.

Figure 1:
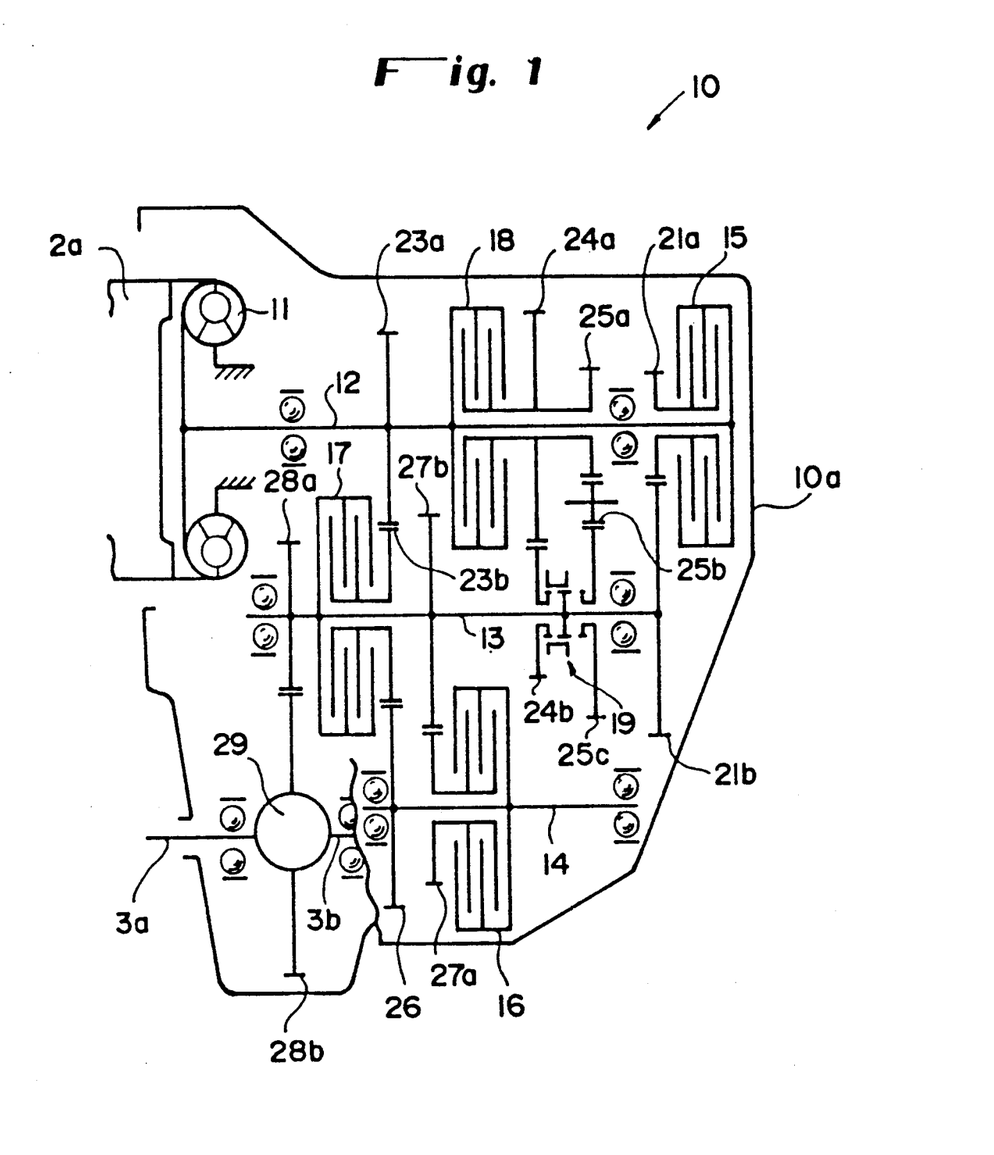
FIGS. 1, 4 and 5B are schematic cross-sectional views of transmissions according to the present invention.
Figure 2:
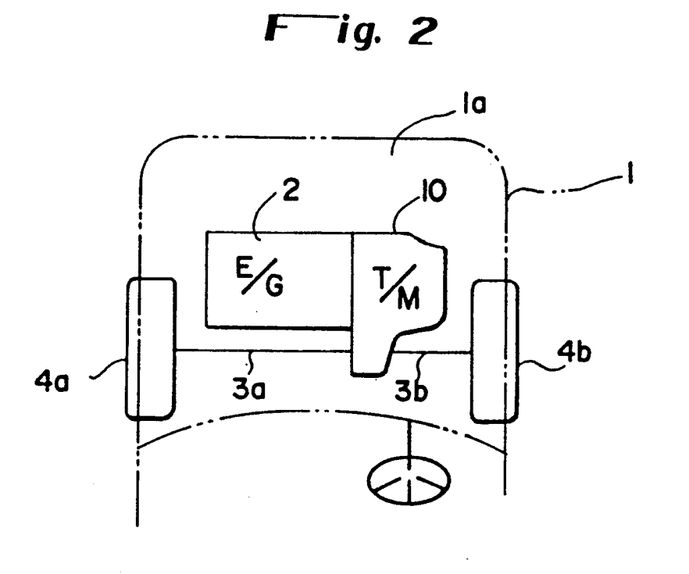
FIGS. 2 and 5A are schematic plan views showing power lines in automobiles incorporating the transmissions of the invention.

FIG. 2 is a schematic plan view showing a power line in an automobile 1 which is a FF automobile that drives front road wheels 4a, 4b in the illustrated embodiment. The automobile 1 has an engine 2 disposed in an engine compartment 1a with the crankshaft extending transversely of the automobile body, and a transmission 10 coupled to a side end of the engine 2. Output power from the transmission 10 is transmitted to the front wheels 4a, 4b via lateral axle shafts 3a, 3b. As can be seen from FIG. 1, it is desirable to reduce the dimensions of the engine 2 and the transmission 10 in the transverse direction of the automobile body for easy installation of the engine 2 and the transmission 10 into the engine compartment 1a in the front portion of the automobile body.

The transmission 10 includes a case 10a joined to the engine 2 and has a transmission input shaft 12 coupled via torque converter 11 to a flywheel 2a serving as an output shaft of the engine 2. The transmission 10 further has an output shaft 13 and a countershaft 14 which lie parallel to the input shaft 12.

On the input shaft 12, there are mounted four drive gears 21a, 23a, 24a, 25a and hydraulic clutches 15, 18 for selecting first and fourth gear positions, these gears and clutches being juxtaposed in the axial direction. The drive gear 23a which is provided for a third gear position is fixed to the input shaft 12. The drive gears 21a, 24a, 25a which are provided for the first and fourth gear positions and a reverse gear position, respectively, are rotatably mounted on the input shaft 12, and can selectively be coupled to and separated from the input shaft 12 by the first- and fourth-gear-position hydraulic clutches 15, 18.

On the output shaft 13, there are mounted an output drive gear 28a, four driven gears 21b, 23b, 24b, 25c held in mesh with the drive gears 21a, 23a, 24a, 25a, respectively, a driven gear 27b for a second gear position, a hydraulic clutch 17 for selecting the third gear position, and a dog clutch 19 for selecting the reverse gear position, these gears and clutch being juxtaposed in the axial direction. The output driven gear 28a, the driven gear 27b for the second gear position, and the driven gear 21b for the first gear position are fixed to the output shaft 13. The driven gears 23b, 24b, 25c which are provided for the third and fourth gear positions and the reverse gear position, respectively, are rotatably mounted on the output shaft 13, and can selectively be coupled to and separated from the output shaft 13 by the first-gear-position hydraulic clutch 17 and the reverse-gear-position dog clutch 19.

Therefore, between the input and output shafts 12, 13, there are axially juxtaposed four sets of transmission driver and driven gear 21a, 21b; 23a, 23b; 24a, 24b; 25a, 25b, 25c, the hydraulic clutches 15, 17, 18 (clutching means) and the dog clutch 19 (clutching means) for selecting one of these gear sets.

The countershaft 14 supports thereon a drive gear 26 for the second gear position which is fixed to the countershaft 14 and held in mesh with the third-gear-position driven gear 23b rotatably mounted on the output shaft 13, a clutch gear 27a for the second gear position which meshes with the second-gear-position driven gear 27b fixed to the output shaft 13 and is rotatably mounted on the countershaft 14, and an clutching means mounted on the countershaft 14 for connecting or disconnecting the second-gear-position drive gear 26 with the second-gear-position clutch gear 27a.

An output driven gear 28b meshing with the output drive gear 28a is mounted on the axle shafts 3a, 3b coupled to the wheels 4a, 4b, respectively, through a differential mechanism 29.

Figure 3:
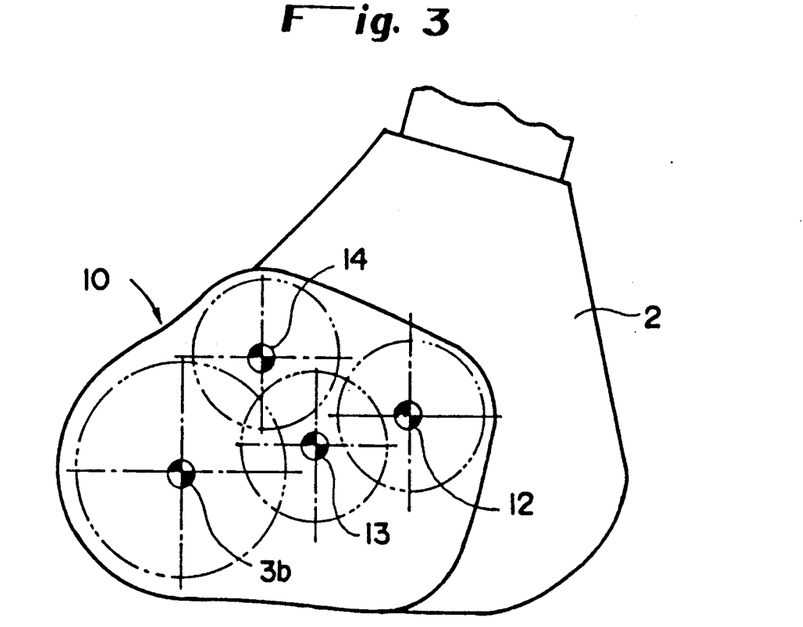
FIG. 3 is a side elevational view of the transmission shown in FIG. 1.

As shown in FIG. 3, the output shaft 13 and the axle shafts 3a, 3b are disposed substantially laterally of the input shaft 12 which is positioned coaxially with the crankshaft of the engine 2, and the countershaft 14 is disposed obliquely upwardly of the output shaft 13.

In the illustrated embodiment, the third-gear-position drive gear 23b corresponds to a first gear as recited in the claim, the second-gear-position drive gear 26 to a second gear, the second-gear-position clutch gear 27a to a third gear, the second-gear-position driven gear 27b to a fourth gear, and the clutching means for connecting or disconnecting the second gear with the third gear comprises a second-gear-position hydraulic clutch 16.

A power transmission path in the transmission 10 thus constructed will be described below.

Output power from the engine 2 is transmitted via the torque converter 11 to the transmission input shaft 12. Dependent on the operation of a shift lever positioned at the driver's seat and the running conditions of the automobile, the hydraulic clutches 15 through 18 for selecting the first through fourth gear positions and the dog clutch 19 for selecting the reverse gear position are selectively operated to determine a power transmission path.

More specifically, where any of the hydraulic clutches 15 through 18 are disengaged and the dog clutch 19 is positioned in engagement with the four-gear-position driven gear 24b, the input shaft 12, the gear 23a fixed thereto, the gear 23b meshing with the gear 23a fixed thereto, the gear 23b meshing with the gear 23a, the gear 26 meshing the gear 23b, and the countershaft 14 to which the gear 26 is fixed, are rotated. However, no engine output power is transmitted to the output shaft 13, and the transmission is kept in a neutral position.

When the first-gear-position hydraulic clutch 15 is then engaged, the first-gear-position drive gear 21a is rotated with the input shaft 12 to transmit the rotation of the input shaft 12 to the output shaft 13 through the first gear-position gear train 21a, 21b while the speed of rotation is being changed by the gear train 21a, 21b. Then, the rotation is transmitted via the output gear train 28a, 28b to the axle shafts 3a, 3b to drive the wheels 4a, 4b in the first gear position.

When the first-gear-position hydraulic clutch 15 is disengaged and the second-gear-position hydraulic clutch 16 is engaged, the second-gear-position clutch gear 27a is connected to the countershaft 14. The gear 26 fixedly mounted on the countershaft 14 is in mesh with the gear 23a fixed to the input shaft 12 through the gear 23b rotatably mounted as an idler gear on the output shaft 13. Since the rotation of the input shaft 12 is transmitted to the countershaft 14 via the gears 23a, 23b, 26, as described above, the rotation thus transmitted from the input shaft 12 is then transmitted to the output shaft 14 via the second-gear-position clutch gear 27a and the driven gear 27b. The engine output power is therefore transmitted from the output shaft 14 via the output gear train 28a, 28b to the axle shafts 3a, 3b to drive the wheels 4a, 4b in the second gear position.

When the second-gear-position hydraulic clutch 16 is disengaged and the third-gear-position hydraulic clutch 17 is engaged, the third-gear-position driven gear 23b is coupled to the output shaft 13. Accordingly, the rotation of the input shaft 12 is transmitted to the output shaft 13 through the third-gear-position gear train 23a, 23b while the speed of rotation is being changed by the gear train 23a, 23b, to drive the wheels 4a, 4b in the third gear position. When the third-gear-position hydraulic clutch 17 is disengaged and the fourth-gear-position hydraulic clutch 18 is engaged, the fourth-gear-position drive gear 24a is connected to the input shaft 12. (At this time, inasmuch as the reverse-gear-position drive gear 25a is coupled to the fourth-gear-position drive gear 24a, the gear 25a is also connected to the input shaft 12, but the gear 25c is freely rotatable on the output shaft 13 by the reverse-gear-position dog clutch 19.) The rotation of the input shaft 12 is now transmitted to the output shaft 13 via the fourth-gear-position gear train 24a, 24b and the dog clutch 19 while the speed of rotation is being changed by the gear train 24a, 24b, to drive the wheels 4a, 4b in the fourth gear position.

For selecting the reverse gear position, while the fourth-gear-position hydraulic clutch 18 is being engaged, the dog clutch 19 is operated to connect the reverse-gear-position driven gear 25c to the output shaft 13. At this time, the rotation of the input shaft 12 is transmitted to the output shaft 13 via the idler gear 25b, so that the output shaft 13 is rotated in the direction opposite to the direction of rotation when the first through four gear positions are selected, thus driving the wheels 4a, 4b in the reverse gear position.

As described above, the transmission 10 can select any one of the first through fourth gear positions simply by selectively engaging a corresponding one of the hydraulic clutches 15 through 18. With the conventional transmission of the three parallel shaft type, both main and auxiliary transmission mechanisms have to be operated to change gear positions, and hence transmission control has been complex. The transmission of the present invention however allows easy transmission control especially where it is employed as an automatic transmission. The direction of rotation of the output shaft 3 is the same as the direction of rotation of the output shaft 73 of the conventional transmission of the two parallel shaft type as shown in FIG. 6. Therefore, it is simple to replace the conventional transmission of the two parallel shaft type with the transmission of the present invention.

Since the second-gear-position hydraulic clutch 16 and the fourth-gear-position hydraulic clutch 18 are aligned with each other perpendicularly to their axial direction, the axial dimension of the transmission is shorter than that of the conventional transmission shown in FIG. 6 by the width of such a hydraulic clutch.

With the transmission being thus reduced in its axial dimension, an installation space in the engine compartment 1a for placing the engine and the transmission transversely of the automobile body has a large margin, allowing the engine and the transmission to be installed with ease. The shafts 12, 13, 14 in the transmission 10 are rendered short, and so are their spans supported by bearings, resulting in higher shaft rigidity. Accordingly, the gears supported on these shafts are held in neat and smooth mesh, produce less noise, and have increased durability. A transmission case 10a of the transmission 10 is also reduced in size, increased in rigidity, and reduces vibration and noise of the transmission and the power line coupled thereto.

Figure 4:
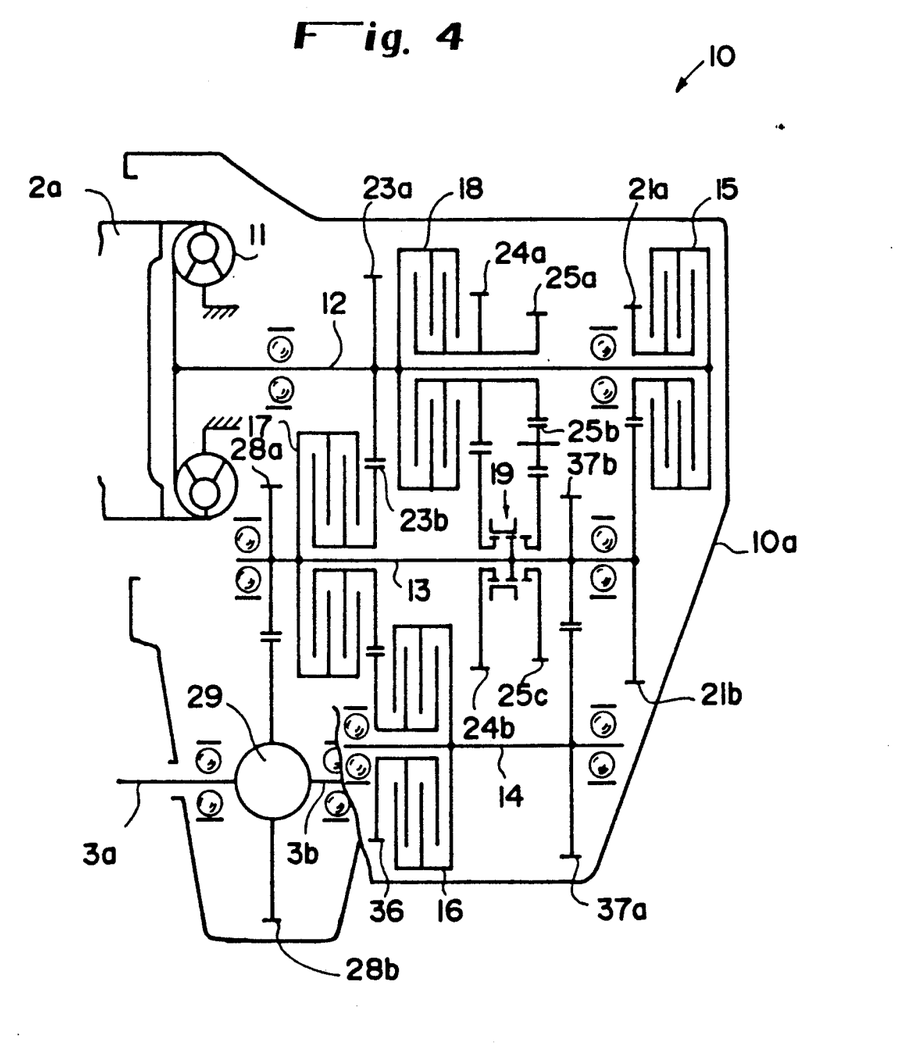

FIG. 4 shows a transmission according to a different embodiment of the present invention. In this embodiment, a second-gear-position clutch gear 36 rotatably mounted on the countershaft 14 is held in mesh with the third-gear-position driven gear 23b, and a second-gear-position drive gear 37 fixedly mounted on the countershaft 14 is held in mesh with a second-gear-position drive gear 37b fixedly mounted on the output shaft 14. When the second-gear-position hydraulic clutch 16 is engaged, the second-gear-position clutch gear 36 is coupled to the countershaft 14. Thus, the second-gear-position clutch gear 36 is coupled to the second-gear position drive gear 37a by the second-gear-position hydraulic clutch 16. Consequently, the rotation of the input shaft 12 is transmitted to the countershaft 14 through the third-gear-position driven gear 23b operating as an idler gear, and then transmitted to the output shaft 13 through the second-gear-position drive and driven gears 37a, 37b to drive the wheels 4a, 4b in the second gear position.

In the embodiment of FIG. 4, the third-gear-position driven gear 23b corresponds to a first gear as recited in the claim, the second-gear-position clutch gear 36 to second gear, the second-gear-position driver and driven gears 37a, 37b to third and fourth gears, respectively, and the second-gear-position hydraulic clutch 16 to a clutching means for connecting or disconnecting the second gear with the third gear.

Figure 5A:
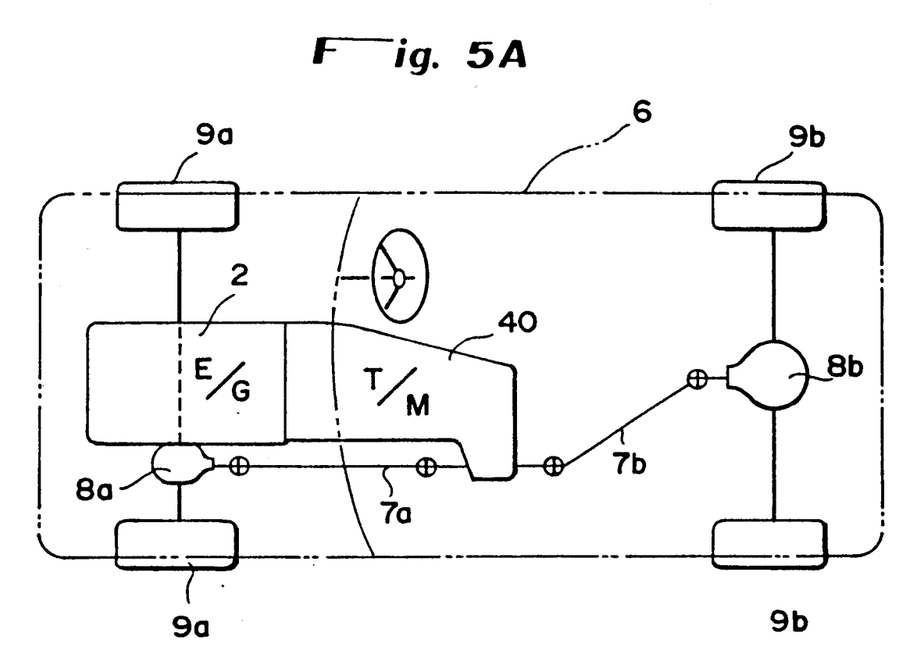
Figure 5B:
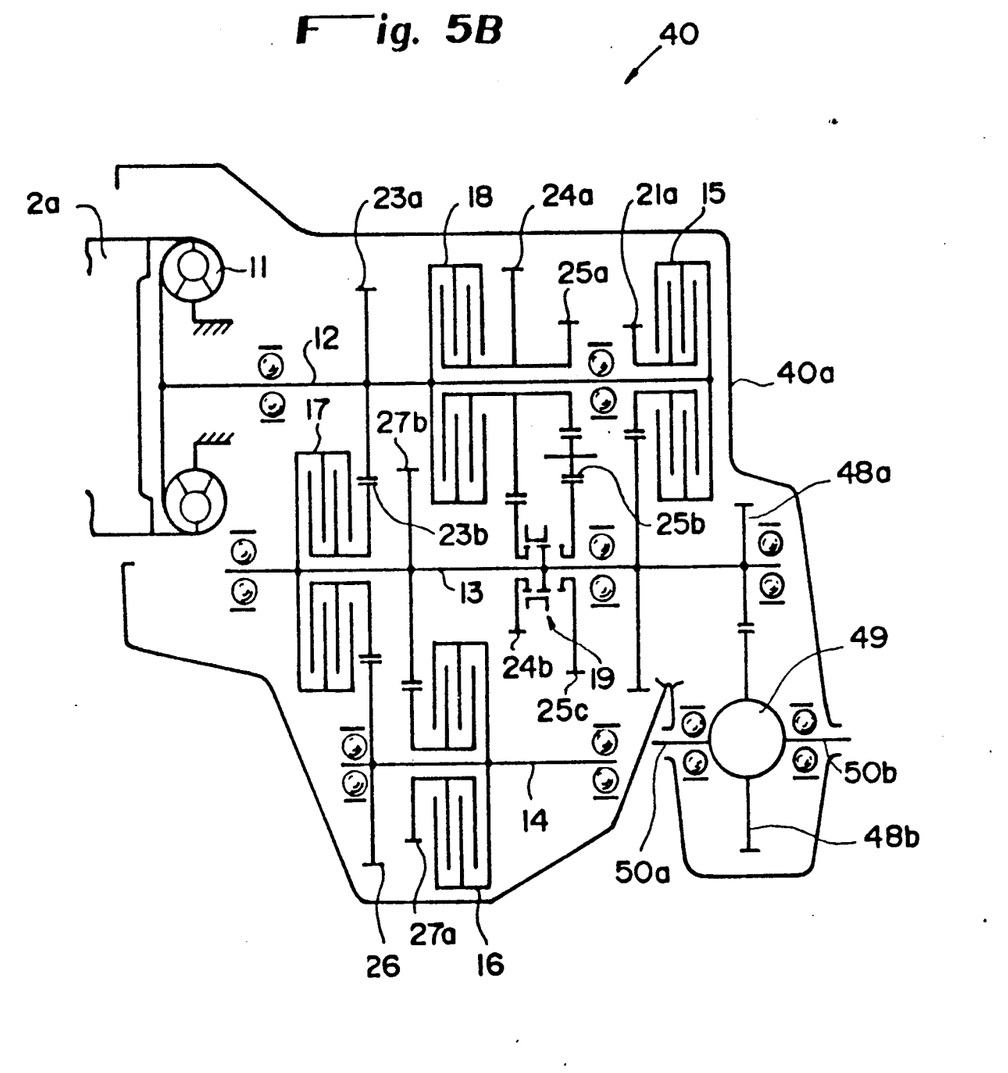

While the present invention has been described above with reference to transmission disposed in the transverse direction of an automobile body, the principles of the invention are also applicable to a transmission disposed in the longitudinal direction of an automobile body. Such an arrangement in which the transmission is disposed longitudinally will be described below. FIG. 5A is a schematic plan view showing a power line in an automobile in which an engine 2 is disposed with its crankshaft extending longitudinally with respect to an automobile body 6. The illustrated automobile is a 4-wheel-drive automobile. A transmission 40 is coupled to the rear end of the engine 2. Drive power of the engine 2 is transmitted from drive shafts 7a, 7b extending forwardly and rearwardly from the transmission 40 via respective differential mechanisms 8a, 8b to front and rear road wheels 9a, 9b. The transmission 40 has substantially the same internal structure as that of the transmission 10 described above, as shown in FIG. 5B. The transmission mechanism of the transmission 40 is identical to that of the transmission 10. However, the output pickup portion of the transmission 40 is of a different structure since the transmission 40 is longitudinally disposed and the automobile is a 4-wheel-drive automobile. More specifically, an output drive gear 48a is mounted on the righthand (as shown) end of the output shaft 13, and an output driven gear 48b meshing with the gear 48a is operatively coupled to front and rear output pickup shafts 50a, 50b through a differential mechanism 49. The output pickup shafts 50a, 50b are coupled respectively to the drive shafts 7a, 7b. As shown in FIG. 5A, the rear portion of the transmission 40 projects into the passenger compartment, thus reducing the space in the passenger compartment. However, since the longitudinal dimension (axial dimension) of the transmission 40 is reduced by arranging the internal structure of the transmission in the manner described above, the extent to which the rear portion of the transmission projects into the passenger compartment is reduced, and hence the space in the passenger compartment is increased.

While the automatic transmission have been described in the above embodiments, the arrangement of the present invention can be employed in a manually operated transmission which has a main clutch mechanism positioned in placed of the torque converter and operable by a clutch pedal depressed by the driver, and a synchromesh dog clutch mechanism disposed in place of the hydraulic clutches.

With the present invention, as described above, a plurality of transmission gear trains and an clutching means are disposed between input and output shafts, and second and third gears and a clutching means for connecting or disconnecting the second gear with the third gear are disposed on a countershaft extending parallel to the input and output shafts. The clutching means for connecting or disconnecting the second gear with the third gear can be positioned in alignment with the clutching means disposed between the input and output shafts. Therefore, the axial dimension of the transmission can be reduced by the width of such clutching means. Moreover, since any one of gear positions can be selected simply by engaging one clutch, transmission control can be rendered simple and easy (especially for an automatic transmission). Inasmuch as the direction of rotation of the output shaft is the same as the direction of rotation of the output shaft of a conventional transmission of the two parallel shaft type, the transmission of the invention can be installed on an automobile easily in place of the existing transmission of the two parallel shaft type.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An automotive transmission having input and output shafts extending parallel to each other, a plurality of trains of intermeshing transmission gears disposed between the input and output shafts for selecting gear positions, and clutching means for selecting one of the transmission gear trains at a time, comprising:
    a countershaft disposed parallel to said input and output shaft;
    a first gear rotatably mounted on said output shaft and rotatable in interlinked relation to said input shaft;
    a second gear rotatably mounted on said countershaft and meshing with said first gear;
    a third gear fixedly mounted on said countershaft;
    clutching means on said countershaft for connecting or disconnecting said second gear with said third gear; and
    a fourth gear meshing with said third gear and fixedly mounted on said output shaft.

2. An automotive transmission as defined in claim 1; wherein said clutching means includes a hydraulically operable clutch.

3. An automotive transmission as defined in claim 1; wherein said clutching means includes a dog clutch.

4. An automotive transmission as defined in claim 1; wherein said transmission is disposed in a transverse direction of an automobile body.

5. An automotive transmission as defined in claim 1; wherein said transmission is disposed in a longitudinal direction of an automobile body.

* * * * *